(12) United States Patent
Ducharme

(10) Patent No.: US 6,263,039 B1
(45) Date of Patent: Jul. 17, 2001

(54) LOAD COUNTER FOR DUMP TRUCK OR THE LIKE

(76) Inventor: Scott A. Ducharme, 119 Beach Pond Rd., Wolfeboro, NH (US) 03894

( * ) Notice: Subject to any disclaimer, the term of this patent is extended or adjusted under 35 U.S.C. 154(b) by 0 days.

(21) Appl. No.: 09/477,312

(22) Filed: Jan. 4, 2000

(51) Int. Cl.[7] .................................................. G06F 19/00
(52) U.S. Cl. ............................................... 377/15; 377/9
(58) Field of Search ............................ 377/9, 15; 701/35; 177/45; 180/168

(56) References Cited

U.S. PATENT DOCUMENTS

| | | | |
|---|---|---|---|
| 3,219,804 | 11/1965 | Annable | 377/15 |
| 3,496,343 | 2/1970 | Johanson | 377/15 |
| 3,548,165 | 12/1970 | Linnekamp | 377/15 |
| 3,683,366 | 8/1972 | Turpin, Jr. | 340/325 |
| 4,108,269 | 8/1978 | Nakao | 180/98 |
| 4,542,461 | 9/1985 | Edlridge et al. | 364/424 |
| 4,635,739 | * 1/1987 | Foley et al. | 177/45 |
| 4,757,712 | 7/1988 | Jurca | 73/432.1 |
| 5,995,888 | * 11/1999 | Hagenbuch | 701/35 |

* cited by examiner

Primary Examiner—Tuan T. Lam
(74) Attorney, Agent, or Firm—Dike, Bronstein, Roberts & Cushman, IP Group of Edwards & Angell, LLP; George W. Neuner

(57) ABSTRACT

A load mechanism operation cycle counter is provided for use with a dump truck or similar vehicle. The counter preferably is operated in response to the initiation and/or cessation of signal to the counter in response to either a load containing body position sensor or the electrical state of load body position control device.

7 Claims, 4 Drawing Sheets

LOAD COUNTER FOR DUMP TRUCK OR THE LIKE

BACKGROUND

1. Field of the Invention

The present invention generally relates to apparatus for acquiring and storing quantitative information regarding the extent of use of machinery. More particularly, the present invention relates to dump trucks and the like, and to apparatus for acquiring, storing and displaying for the operator real time information concerning the extent of use of the dumping mechanisms thereof.

2. Summary of the Prior Art

In the hauling industry, the number of loads transported by a dump truck during various time intervals is important information. For example, the total number of times the dumping mechanism of a dump truck has been utilized over its lifetime may be important in the calculation of depreciation and/or the determination of the present value of the truck for resale purposes. Similarly, a record of the number of times the dumping mechanism of a dump truck has been utilized since a selected point in time is one way of determining when preventive maintenance on that mechanism is due to be performed. Further, particularly in the case of individual or small dump truck owner/operators, it is not unusual for a contractor to compensate the owner/operator on the basis of an agreed upon amount per load hauled. Accordingly, there is a need in the art for a simple, inexpensive, and automatic apparatus for acquiring, storing and displaying in "real-time" information regarding the number of times the dumping mechanism of a dump truck has been utilized during any one, or all, of numerous predetermined time periods.

Heretofore, dump mechanism utilization information typically has been maintained manually either by the maintenance of hand-written tally sheets, and/or by the operation of manual counting devices. These alternatives are notoriously inaccurate, due both to the possibility of intentional miscounting and to the possibility of inadvertent, unintentional error. Accordingly, information regarding the extent of utilization of the dumping mechanism of a dump truck is often either not available at all, or to the extent that it is available, is totally undependable In view of this situation, it has been proposed that a microprocessor may be utilized to acquire and store information from various sensors that detect various information concerning a dump truck's operation in the form of histograms. Among these histograms may be one representing the total time during which the dumping mechanism has been in use during a selected time period. The total time recorded by the histogram theoretically is equal to the number of times the dumping mechanism has been used during the selected time period multiplied by a so-called "one shot" time period. This assumes that the so-called "one shot" time period (i.e., that is a predetermined time period corresponding to the "normal" time required for the completion of a dumping cycle) is the average time of the actual dump cycle time periods encountered in the practical use of the mechanism. Of course, this assumption may, or may not, be accurate in any given situation.

Other features are built into this prior apparatus as well in order to ensure the accuracy of the information acquired and stored by the microprocessor. For example, the acquisition and storage of each dumping mechanism duty cycle as part of its associated histogram is conditioned upon the closing of a switch indicating that the dump body has been elevated relative to the frame of the dump truck. Further, this acquisition and storage of information also is conditioned upon the simultaneous closing of a switch that is indicative of the presence of a minimum hydraulic pressure in the hydraulic lifting means for the dump body of the truck. The requirement of the simultaneous closure of these switches ensures that only those operations of the dumping mechanism involving the dumping of a loaded dump body are acquired and recorded by the microprocessor. This is because the pressure in the hydraulic elevation system is not adequate to close the pressure switch unless the weight being lifted thereby substantially exceeds that of the dump body alone. Hence, only elevations of loaded dump bodies can be acquired and stored by the microprocessor.

Still further, in the prior art system briefly described above, a second "one shot" time period cannot be initiated during the course of the recording of the next previous "one shot" time period. This prevents an operator from successively raising the dump body slightly and then lowering it to its rest position numerous times without discharging a load in order to artificially increase the number of dump mechanism cycles registered in the histogram. In addition, the histogram information acquired and stored in the microprocessor is not directly readable therefrom in "real-time", or otherwise. Instead, the histogram information acquired and stored in the microprocessor must be downloaded to a general-purpose digital computer for further processing prior to the system being capable of providing and/or displaying the continuous flow of information represented by the various histograms in a meaningful and usable format. (See, U.S. Pat. No. 4,542,461, issued Sept. 17, 1985 to Eldridge, et al. for APPARATUS FOR ACQUIRING DUMP TRUCK DUTY CYCLE DATA, the disclosure of which is hereby incorporated herein by reference).

Accordingly, a total number of duty cycles of the dump mechanism of a dump truck may be calculated from the prior art histogram based on a "one shot" time period. In addition, the prior art apparatus incorporates desirable features, such as the double sensor configuration, to ensure that only valid information is acquired and stored. However, the information acquired and stored by the microprocessor is not acquired and/or stored in a format that is useful in "real-time" to a user without further external processing. In addition, the prior art apparatus is complex and expensive not only in terms of the capital expense involved in its purchase and installation, but also in its operation. This expense, complexity and lack of readily available output all tend to make the Eldridge, et al. type of apparatus impractical for use by any other than the operators of large fleets of vehicles.

The need in the art for a simple, inexpensive, and automatic apparatus for acquiring, storing and displaying real time information to the operator regarding the number of times the dumping mechanism of a dump truck has been utilized, therefore, remains unfilled.

SUMMARY OF THE INVENTION

The present invention provides a counter apparatus for use with a vehicle of the type having a frame, a dump body pivotally attaching said dump body to said frame, an activator for moving said dump body relative to said frame between a first position wherein said dump body is supported by said frame for carrying a load in the dump body and a second position wherein said dump body is disposed at an angle to said first position for dumping the load, and a controller for controlling the activator for dumping the load. The apparatus comprises a sensor that provides a signal indicating the moving said dump body through a dump cycle from said first position to said second position and back to said first position and a counter responsive to said signal for counting and displaying in real time to an operator of the vehicle the number of dump cycles for a period of time. The counter preferably is operated in response to the initiation and/or cessation of signal to the counter in response to either a load containing body position sensor or the electrical state of load body position control device.

Thus, the present invention to provides a simple, inexpensive, and automatic apparatus for acquiring, storing and displaying to the operator in real-time information regarding the number of times the dumping mechanism of a dump truck has been utilized.

In certain embodiments, this apparatus for acquiring, storing and displaying information regarding the number of times the dumping mechanism of a dump truck has been utilized can be readily and inexpensively retrofitted into existing dump trucks.

In other embodiments, the apparatus for acquiring, storing and displaying information can provide the number of times the dumping mechanism of a dump truck has been utilized during different time periods of interest to the user.

Further embodiments of the present invention can provide an apparatus of the type referred to immediately above which also acquires, stores and displays information regarding the beginning and/or end of the time period over which each display of the number of times the dump mechanism of the truck has been utilized was obtained.

In the preferred embodiments of the invention, these objectives are accomplished by the use of a counting device that is responsive to (i.e., registers count indications in response to) each initiation and/or cessation of an electrical current thereto. Further, it is contemplated that the source and control of this electrical current can be derived from other systems forming part of a conventional dumping apparatus. Similarly, however, the desired electrical current can be provided by a separate power source dedicated specifically to the counting system that also is responsive to one or more sensing devices for detecting the operation of a dump cycle without departure from the invention in its broadest aspects.

The choice between these alternatives will vary within the scope of this invention according to various factors easily determined by one of ordinary skill in the art. For example, depending upon the electrical load capacity of the existing circuitry, it may, or may not, be possible to drive the counter using a power take-off therefrom. Similarly, the desires and/or needs of the user may require either an elaborate counter device or a simple counter device, thereby determining the power requirements of the circuitry, and whether or not portions of the counter are required to be constantly, rather than intermittently, powered. In addition, the ease of retrofitting a counting device in accordance with this invention into the existing dump mechanism and/or related sensor circuitry may be determinative of whether or not the power source therefor is internal or external to the systems already present in the truck. Further, in some situations it can be desirable to utilize the present invention not only as an information acquisition and storage device, but also as a safety device. Accordingly, it will be recognized that the invention can be tangentially used to ensure that the dump body is fully lowered at the end of each dump cycle. Alternative sensor dispositions, such as the double sensor configuration discussed above, also can be used in the intermittent current supply to the counter so that the registration of erroneous counts is avoided.

Therefore, as will be discussed in further detail below, the counting device of the present invention provides at least one visual output of at least one dumping mechanism operational parameter which is readable in "real-time" at a convenient, predetermined location on, or associated with, the truck, usually in the cab.

Thus, it will be understood that the preferred embodiments of the counting device of the present invention generally operate in response to electrical currents intermittently operating it, and can be reset depending upon the particular nature of the counter chosen and the needs of the operator. Further, as will be discussed in detail below, various visual outputs can be provided that are indicative of the number of times the dumping mechanism has been operated over differing periods of time. Accordingly, visual outputs of information indicative of the start and/or finish of each preselected time period associated with each numeric output of a recorded number of dump mechanism operation cycles also can be provided in real-time within the scope of the present invention in its broadest aspects.

BRIEF DESCRIPTION OF THE DRAWINGS

These, and other features and advantages of the present invention, will become more apparent from the following detailed description of several preferred embodiments of the invention. This detailed description is to be read in conjunction with the appended drawings, wherein like reference numerals are used to refer to like elements throughout, and wherein.

DETAILED DESCRIPTION OF PREFERRED EMBODIMENTS

Figure 1:
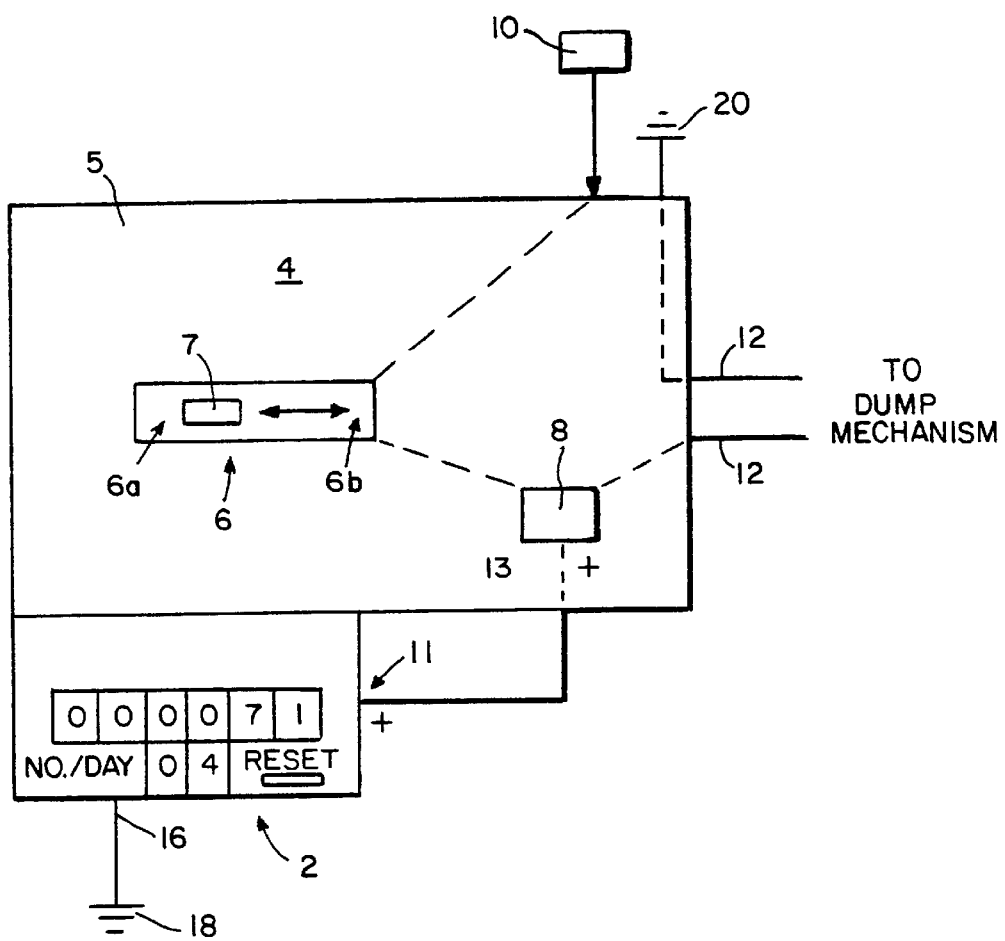
FIG. 1 is an illustrative, diagrammatic view of a counter in accordance with the present invention electrically, and permissibly mechanically, connected to a portion of a dump control mechanism adapted to provide an audio and/or visual indication that the dump body is in an elevated position.

Turning now to the drawings, and specifically to FIG. 1, there is shown a diagrammatic, illustrative view of a load counter, generally indicated at 2, in accordance with the present invention. In this figure, block 4 is representative of any of the well-known dump control mechanisms typically used on a dump truck. Block 6 generally is representative of an actuation device for the control mechanism 4. Finally, block 8 is representative of any of the well known electrical means built into a dump truck for providing an audio and/or visual alert indicating that the dump body is in an elevated position or that the tail gate of the dump body is in its open position.

Alert devices of the type just mentioned typically take the form of a warning light, a buzzer, a beeper and/or other audio or visual devices electrically connected in series with a power supply and appropriate sensing elements. Generally speaking, these alert devices are conspicuously visible to, and/or readily hearable by, the truck operator, and often those nearby as well. The sensing elements, on the other hand, detect the relative position dump body of the truck, or the state of various components of the dumping mechanism. Further, block 10 is representative of an input power source for the control mechanism 4. In addition, lines 12 are indicative of the electrical connection of the controller 4 to a dump body movement sensor and/or to the dump body actuation means such as a hydraulic motor/pump combination (not specifically shown) for a hydraulic piston drive mechanism (see generally FIG. 9).

Accordingly, it will be understood from FIG. 1 that in one preferred embodiment of the invention, the dump control mechanism 4 may take the form of a so-called PTO device. This device is typically, but not always, mounted in the cab of the truck next to the operator. In situations wherein the control mechanism is located outside of the cab, it still can be important to locate the counter in the cab. For example, the operator of the truck is responsible for bookkeeping, billing or the like immediately upon the delivery of a load(s). In such a case, the operator can prefer a location protected from the elements, but having direct access to data regarding such factors as the number of loads dumped, the total elapsed time period for multiple deliveries, or both, in accomplishing that portion of his duties.

In any case, a typical PTO device 4 generally includes a housing 5 defining a slot 6, and a lever member 7 pivotally (or slidably) mounted in the slot 6 for movement between a so-called "engaged" position 6a, and a so-called "disengaged" position 6b (see diagrammatic illustration of FIG. 1). In addition, the housing includes a conspicuously located light socket containing a light bulb that is often covered by a red (or other conspicuously colored) lens (see block 8 of FIG. 1). Further, the PTO device is powered by an external power supply 10, such as the electrical system of the truck or a separate internal battery.

The PTO device functions, at least in part, as an electrical switch. Thus, when the lever 6 is in the engaged position 6a, the electrical switch is closed. The closure of this switch allows a flow of current to be initiated in the control mechanism 4. This, in turn activates the light 8 and a dump body elevation means, such as a hydraulic pump connected between a source of hydraulic fluid and a hydraulically driven lift mechanism (see generally FIG. 9). Conveniently, this generally can be accomplished by electrically connecting the power supply 10, the switch controlled by the lever 6, the light 8 and the electrically powered hydraulic pump in series, as is illustratively and diagrammatically depicted in FIG. 1. It is to be understood, however, that there are numerous ways to connect these devices to accomplish the same result, and that the present invention is not limited to the example just described. For example, the PTO can contain an electrical switch for controlling the light as set forth above, while at the same time acting as a transmission type of device for controlling the direction and speed of an external driving force applied to a dump body elevating device.

Similarly, it is well known in the art that dump trucks are often supplied with electrical circuits for alerting their operators when the dump body is in an elevated position and/or when the tailgate of the dump body is not fully closed. Indeed, truck manufacturers often supply features of this type as standard equipment; just as back-up warning audio and/or visual devices are commonly supplied with such motor vehicles. A counter such as that discussed above can be operated by a power take-off from any such alerting device circuit in a manner similar to that just described regarding the PTO device. This, of course, assumes that the power requirements of the counter and of the circuit do not together exceed the load capacity of the circuit.

In view of the above, it will be understood that it now has been realized that the automatic, simple, inexpensive and dependable load mechanism operation cycle counting problem can be solved by the addition of an electrically triggered counter to a dump mechanism controller system in a standard dump truck. More specifically, it has been found that counters that are responsive to the initiation and/or cessation of an electrical current are inexpensive and satisfactory solutions to the problems discussed in detail above. Further, it has been found that such counters can be readily utilized either with an existing dump controller and activation/sensor system, or in a separate system, to provide a real time output of desired information concerning the utilization of a dump body controlling mechanism in a user friendly format.

Because the counter of the present invention need only be responsive to the initiation and/or cessation of an electrical current, the basic components of the present invention are readily available. Further, customized modifications of such devices can be created easily within the ordinary skill of those in the art utilizing either analog or digital technology.

For example, a counter including a preseleced number of adjacent, axially mounted, rotatable number rollers, similar to those used in the odometer of an automobile, can be provided. In such a case, a ratchet-like gearing mechanism and a solenoid can be utilized to create an analog electrical counter responsive to the initiation and/or cessation of an electrical current to the solenoid. Specifically, the initiation of an electrical current to the solenoid can be used to move the solenoid shaft outwardly against the ratchet gearing. Thereafter, the solenoid spring return can be used to retract the solenoid shaft upon the cessation of the current. In this instance, the outward movement of the solenoid shaft can be used to advance the counter rollers one unit per dump duty cycle. Also, if the end of the solenoid shaft is appropriately attached to ratchet type gearing, the return movement of the solenoid shaft also can cause the counter rollers to advance one position. In one preferred embodiment, the cycling through two positions advance the counter one unit.

A similar result can be achieved digitally with little difficulty. For example, a liquid crystal diode display could be provided including a counter circuit driven by transistorized switching circuitry alternatively activated by the initiation and/or cessation of a current to selected portions thereof.

Returning now to the drawings, FIG. 1 shows an electrical counter 2 in accordance with the present invention electrically connected at its input 11 to the positive side 13 of an alert device 8 of a dump control mechanism 4. The controller 4 and the dump body elevation device (see generally FIG. 9) define a series circuit between power source 10 and ground 20. Also, the output 16 of the counter 2 is connected to ground 18. Accordingly, when the switch, representatively shown at 6, is closed (i.e., the lever 7 on the PTO 4, is moved to the engaged position 6a to operate the dumping mechanism), current in the series circuit activates the dump body elevation lift mechanism. At the same time, current flows from alert device 8 through counter 2 to ground 18 to activate the counter and its display.

Conversely, when the switch 6 is opened (i.e., the lever 7 of the PTO 4, is moved to the disengaged position 6b), current ceases to flow to either the controller 4 or the counter 2. As noted above, the initiation of current flow to the counter, the cessation of current flow to the counter, or both can be used to cause the counter mechanism to cycle. Further, in a modification of the foregoing, the counter can be designed in such a manner as to register one half of a count each for the initiation and the cessation of a current, respectively. In such a case, the presence of anything other than a whole number of counts on the counter display indicates that the dump mechanism cycle was incomplete. Because this can indicate the failure of the dump body to return to its rest position on the truck frame or some other undesirable condition, it provides a safety feature for the use of the truck operator. Indeed, a possible modification of this invention can include the addition of a condition sensing circuit to alert the operator to the presence of an inappropriate counter position.

As alluded to above, it has been recognized that the electrical power (load) capacity of the dump controller mechanism 4, and/or all or some of the components thereof, can make it inappropriate to attempt to drive the counter and the controller with the same power source 10. In such a case, the counter 2 can be provided with its own power source, generally indicated at 22 (see FIGS. 5–8). It also is preferable in such a case that the counter also be provided with its own sensors indicative of the status of the dump body relative to the truck frame, as generally indicated in FIGS. 5–9, and discussed in greater detail below.

Figure 2:
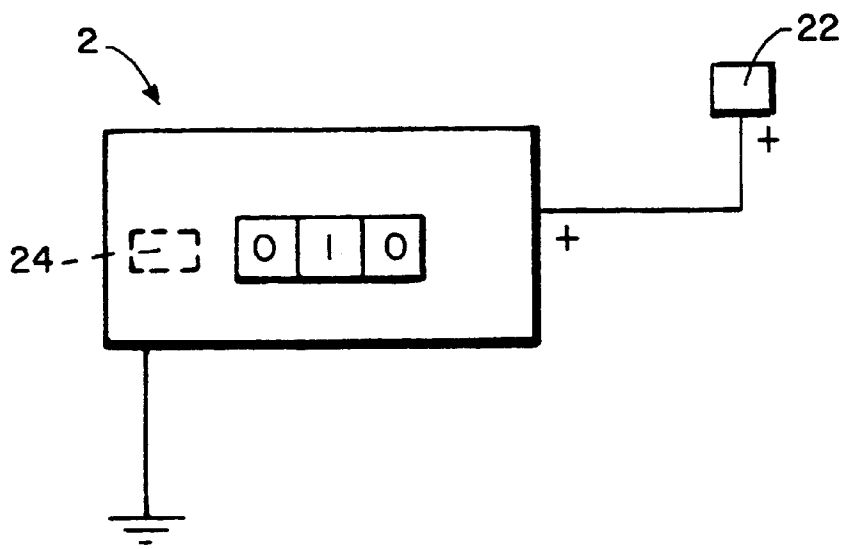
FIG. 2 is an illustrative, diagrammatic view of another counter in accordance with the present invention wherein the power source therefor is shown as being separate from that of the dump control mechanism.

Before discussing the latter alternatives, it should be recognized that the counter 2 can be very simple, very complex or something between the two, without departure from the present invention in its broadest aspects. Thus, for example, the counter 2 shown in FIG. 2 includes only a mechanism for counting the cumulative number of loads hauled over the life of the vehicle. This is perhaps the simplest of the counters contemplated by the present invention. The addition of a reset capability (indicated in phantom in FIG. 2) expands the capability of the counter. Specifically, the inclusion of a reset capability allows the number of loads hauled over a predetermined period of time, such as a day or for a particular contract, to be automatically tallied, and the counter reset for the next desired sequence of counts.

Figure 3:
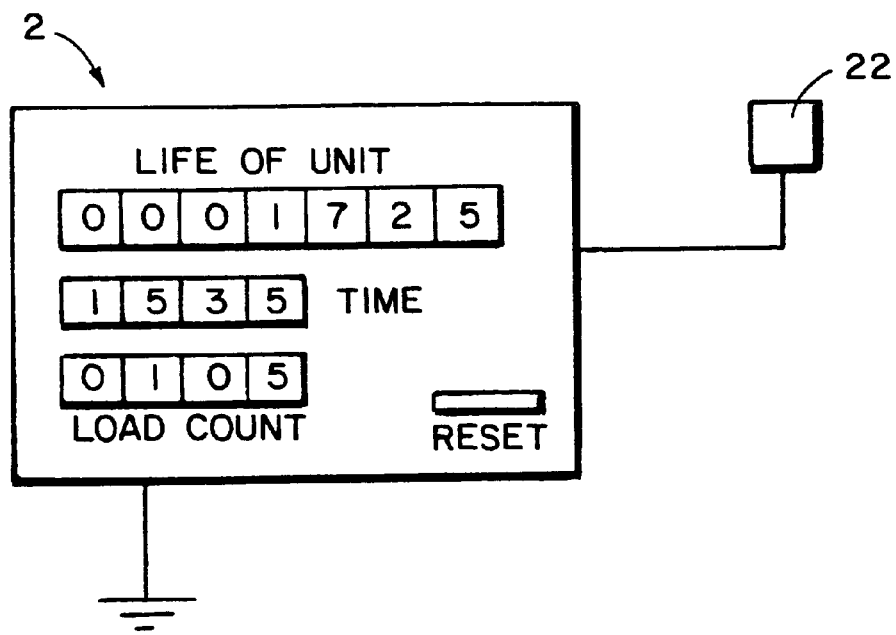
FIG. 3 is an illustrative, diagrammatic view similar to FIG. 2, depicting still another counter in accordance with the invention.
Figure 4:
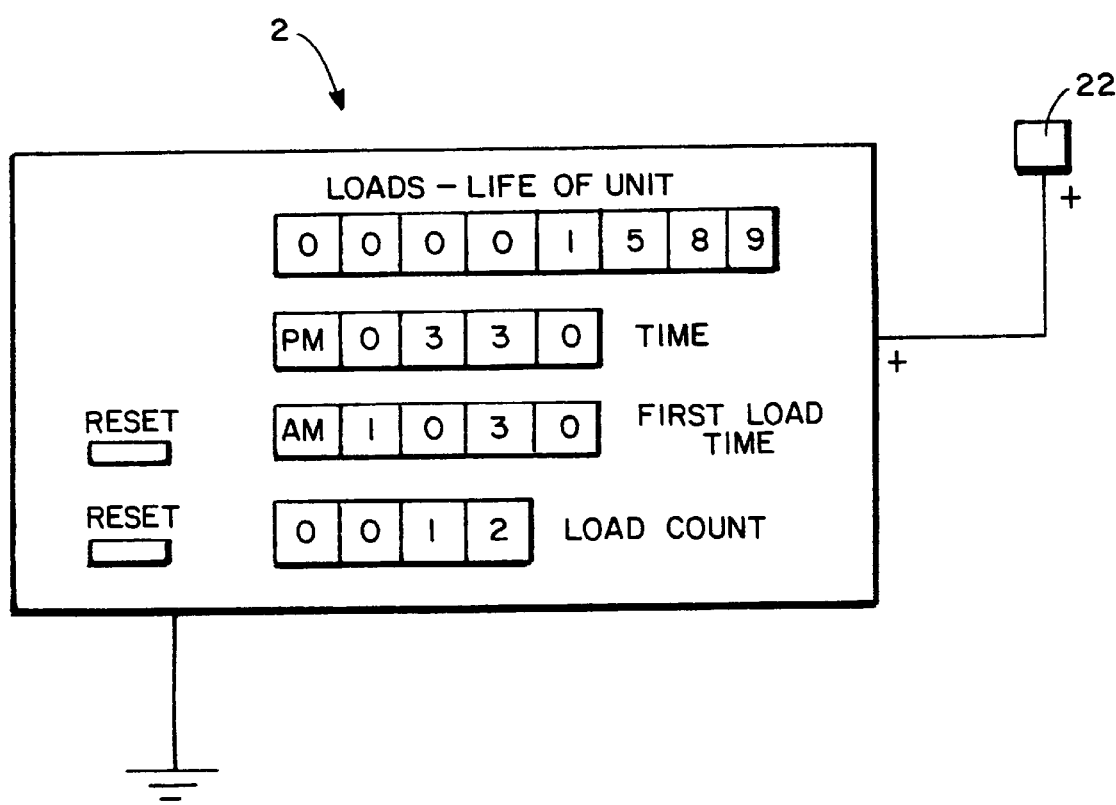
FIG. 4 is an illustrative, diagrammatic view similar to FIG. 2, depicting yet another counter in accordance with the present invention.

In addition, various additional levels of counter complexity are contemplated. Thus, as shown in FIG. 1, a life of the unit counter in combination with a resetable counter similar to that just discussed with respect to FIG. 2 can be provided. Further, as representatively shown in FIGS. 3 and 4, the number of cycles of the dumping mechanism over the life of the unit and over a selected time period can be combined with various time indications. Thus, as shown in FIG. 3, the current time, the start time of a job, or the finish time of a job can be simultaneously displayed with the number of dump mechanism cycles recorded for the life of the unit, over a selected time period, or both (see FIG. 4). Of course, in the latter cases, the clocks preferably are powered separately from the counting mechanism. In practice, this generally can be accomplished by the use of an internal or external battery because the operation of the counter portion of the device is dependent upon the alternating presence and absence of a signal from the sensor.

Still further levels of complexity of the counter output display quantities are possible within the scope of the invention in its broadest aspects. Thus, for example, the counter can be set to incrementally advance not in terms of the number of cycles of the dumping mechanism, but rather in increments of the cost per load. In such a case, the counter would register the income generated by the truck over a set period of time, its lifetime, or both. Still further, in the extreme, an output of the counter indicative of the number of counts registered over a predetermined time period can be input to, or the counter be made part of, an on-board microprocessor for more complex processing and display. Of course, it must be kept in mind that the more complex the counter and its associate devices become, the further the resulting device/system departs from the simplicity and lack of significant capital expense associated with the purchase, installation and use of the invention. Nevertheless, the avoidance of the need for external processing in order to obtain usable data remains a significant benefit of this invention, even in the case wherein an on-board microprocessor and related display device are used.

Returning now to FIGS. 5–9, two of the many available alternatives for providing current initiation and cessation to the counter in those cases wherein for one reason or another it is not possible to utilize the built in alert circuitry of the truck are illustratively depicted. In each of these cases, a separate power source is provided, as is a separate sensor mechanism for detecting the elevation of the dump body and its return to rest on the truck frame.

Figure 5:
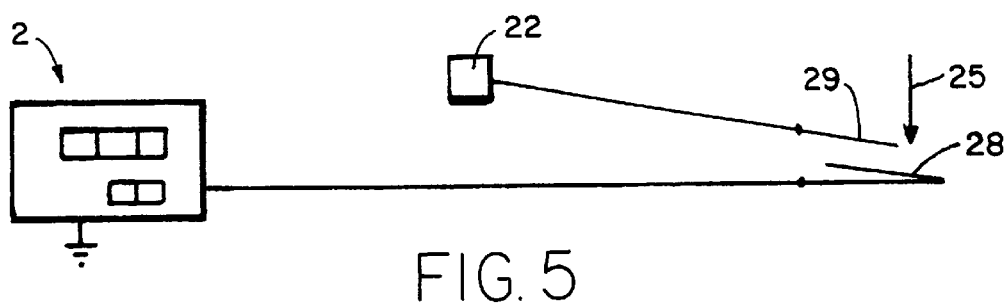
FIGS. 5 and 6 are illustrative, diagrammatic views of a dump mechanism counting system in accordance with the present invention wherein a switch responsive to the position of the dump body determines the initiation and cessation of a flow of current through a counter in accordance with the present invention.
Figure 6:
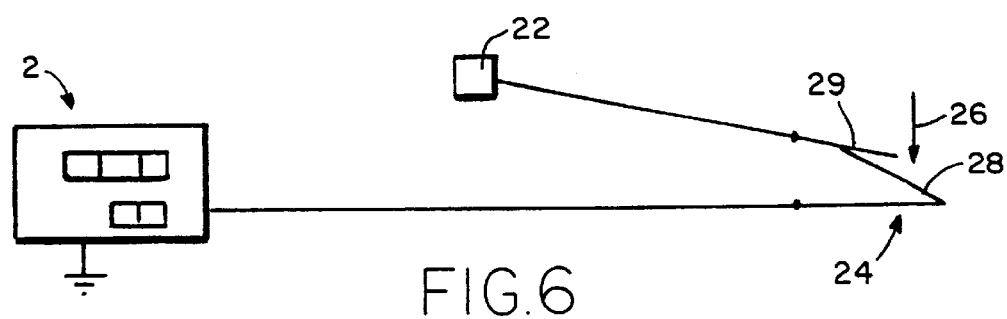

In FIGS. 5 and 6, a switch mechanism 24 is shown which is open when the dump body rests on the truck frame, as representatively shown by arrow 25, and is closed when the dump body is elevated, as representatively shown by arrow 26. To accomplish this, the switch mechanism 24 includes a resilient member 28 that is flexed away from its associated contact 29 by the dump body at rest against the frame of the truck (see FIG. 5). When the dump body is elevated, the resilient member 28 springs back against its associated contact 29, thereby completing the circuit and initiating a current to counter 2. When the dump body returns to its rest position, the switch 24 is opened again, and the current stops.

Figure 9:
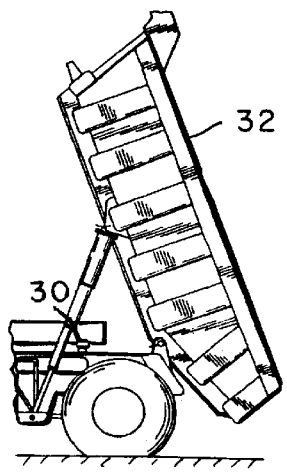
FIG. 9 is a detailed, illustrative, diagrammatic view depicting the location of a switch such as that shown in FIGS. 5 and 6, or FIGS. 7 and 8, relative to the frame, dump body and elevation mechanism of a dump truck.
Figure 7:
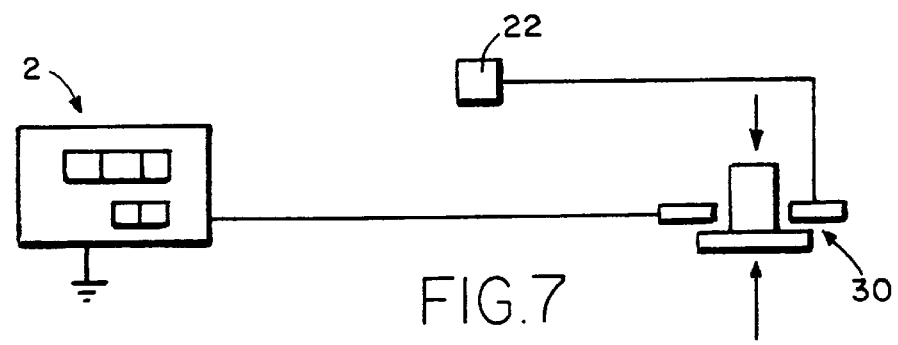
FIGS. 7 and 8 are illustrative, diagrammatic views similar to those of FIGS. 5 and 6, wherein another type of switch is used to cause the initiation and cessation of a flow of current through a counter in accordance with the present invention.
Figure 8:
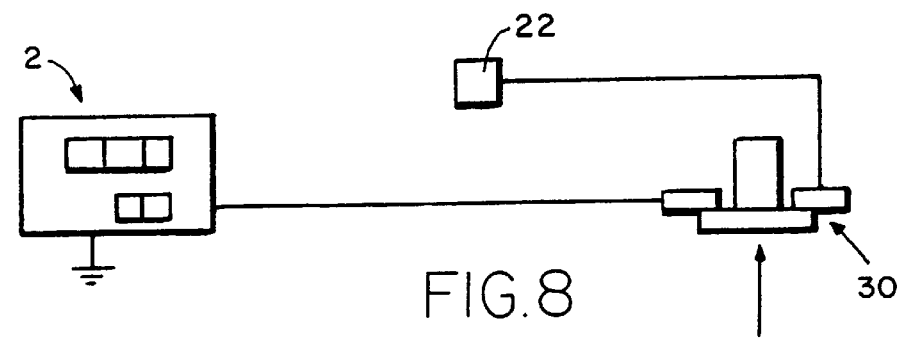

The alternative depicted in FIGS. 7–9 is similar. In this case, a spring-loaded switch (representatively shown at 30 in FIGS. 8 and 9) is located beneath the front portion of the dump body 32. When the dump body is in its rest position against the frame of the truck, the switch 30 is held in the open position, and no current flows to the counter (see FIG. 7). Upon the elevation of the dump body 32, however, the switch 30 springs closed (see FIG. 8) thereby initiating an electrical current to the counter 2. This current is stopped when the dump body returns to its rest position forcing the contacts of the switch 30 away from one another.

Having thus described several preferred embodiments of the invention, numerous variations, changes, modifications, alterations and the like will occur to those skilled in the art. It, therefore, is to be understood that the foregoing specification has been set forth by way of illustration only, and not as limiting of the invention claimed.

What is claimed is:

1. An apparatus for use with a vehicle of the type having a frame, a dump body pivotally attaching said dump body to said frame, an activator for moving said dump body relative to said frame between a first position wherein said dump body is supported by said frame for carrying a load in the dump body and a second position wherein said dump body is disposed at an angle to said first position for dumping the load, and a controller for controlling the activator for dumping the load; said apparatus comprising:

- a sensor that provides a signal indicating the moving said dump body through a dump cycle from said first position to said second position and back to said first position; and
- a counter responsive to said signal for counting and displaying in real time to an operator of the vehicle the number of dump cycles for a period of time.

2. An apparatus according to claim 1, wherein said sensor is connected to the controller such that a signal is provided by said sensor each time said dump is cycled.

3. An apparatus according to claim 1, wherein said sensor is located on said frame and provides a signal each time said dump body is moved out of said first position.

4. An apparatus according to claim 1, wherein subsequent to the generation of a first signal each time said dump body is moved out of said first position, said sensor detects the return of said dump body to said first position and provides second signal indicative of completion of a cycle.

5. An apparatus according to claim 4, wherein said counter is adapted to register one incremental count for said second signal received from said sensor sequentially following the receipt of said first signal.

6. An apparatus according to claim 4, wherein said counter is adapted to register one-half of an incremental count for each signal received from said sensor so that the first and second signals provide one incremental count.

7. An apparatus according to claim 1, wherein said signal is selected from the group consisting of the initiation of an electrical current to said counter, the cessation of an electrical current to said counter, or both.

\* \* \* \* \*